Aug. 19, 1924.
E. BERN
AUTOMOBILE SIGNAL
Filed Jan. 22, 1923
1,505,128
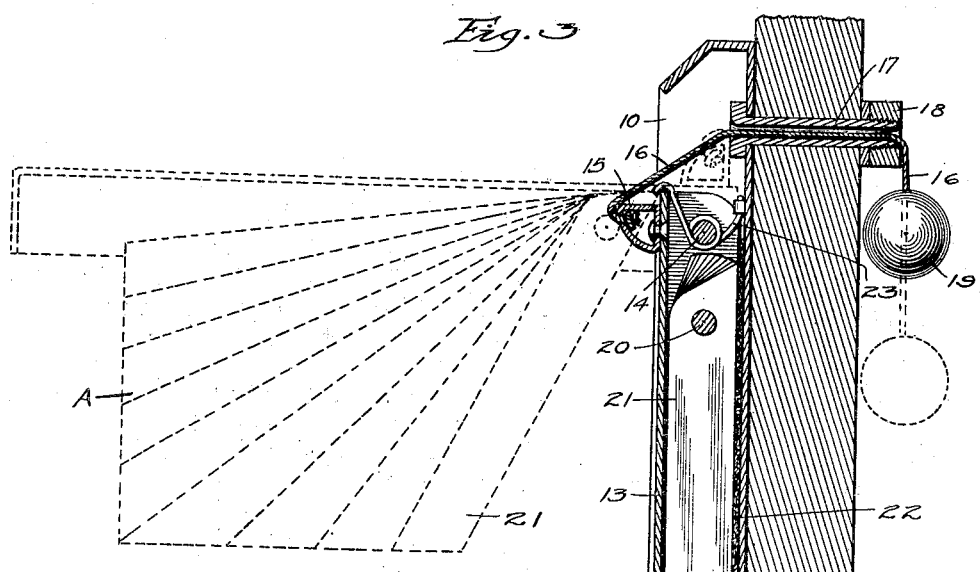
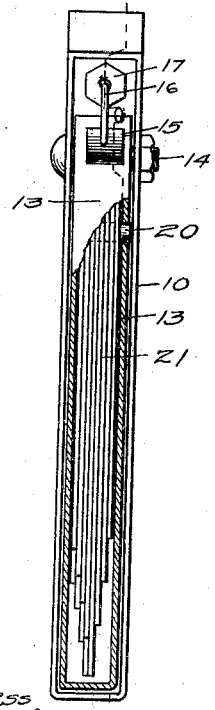
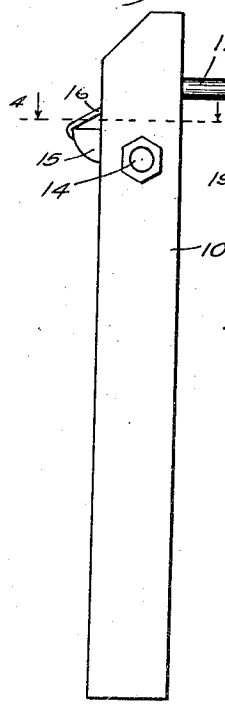
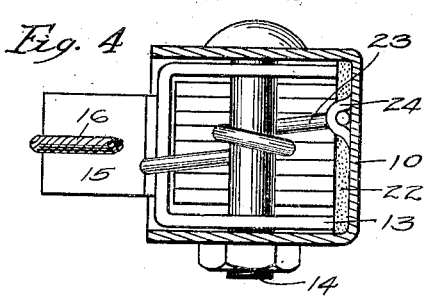
Inventor
Emil Bern
By Bair & Freeman
Att'ys Patented Aug. 19, 1924.

1,505,128

UNITED STATES PATENT OFFICE.

EMIL BERN, OF DES MOINES, IOWA.

AUTOMOBILE SIGNAL.

Application filed January 22, 1923. Serial No. 614,328.

*To all whom it may concern:*

Be it known that I, EMIL BERN, a citizen of the United States, and a resident of Des Moines, in the county of Polk and State of Iowa, have invented a certain new and useful Automobile Signal, of which the following is a specification.

The object of my invention is to provide an automobile signal of simple, durable and comparatively inexpensive construction.

More particularly, my invention relates to an indicating member which is composed of a number of narrow strips and arranged, when moved to operative position, to collectively form a comparatively large member.

Still a further object is to provide a pair of casing members adapted to be received one within another for holding the strips of the indicating member in closed position.

Still a further object is to provide means for normally tending to retain the casing members in their inoperative position.

With these and other objects in view, my invention consists in the construction, arrangement and combination of the various parts of my device, whereby the objects contemplated are attained, as hereinafter more fully set forth, pointed out in my claim and illustrated in the accompanying drawings, in which:

Figure 1 is a side elevation of my automobile signal.

Figure 2 is a front view of the same, parts being broken away and shown in section to better illustrate the construction.

Figure 3 is a sectional view taken on line 3—3 showing the signal attached to an automobile frame member, the indicator being shown in operative position, in dotted lines; and Figure 4 is a detail sectional view taken on line 4—4 of Figure 1.

In the accompanying drawing, I have used the reference numeral 10 to indicate generally a casing which is provided with an open side. The casing 10 may be secured to an automobile body or frame 11 by means of a screw or the like 12. The casing 10 may be secured to any part of the automobile desired.

A second casing member 13 is received within the casing member 10. The casing member 13 is also provided with an open side. A bolt 14 extends through the casing member 10 and through the casing member 13. The casing member 13 is capable of pivotal movement upon the bolt 14.

Secured to the front side of the casing member 13 near the upper end thereof is the short bracket 15. A flexible element of raw hide or the like 16 is secured to the bracket 15.

A guide member 17 extends through the casing 10, above the casing 13, and through the member 11 of the automobile. The free end of the guide member 17 is screw threaded so that a nut 18 may be secured thereon for holding it in position. The guide member 17 supports the upper end of the casing member 10.

The flexible element 16 extends through the guide member 17 and has a ball or some other suitable gripping member 19 secured thereto. The flexible element 16 may be extended to any desired position so that it is within close reach of the driver of the automobile. The casing member 13 may be swung upon its pivot by merely pulling the flexible element 16. The bracket member 15 strikes against the outer end of the guide member 17 for limiting its pivotal movement in one direction.

A pivot pin 20 is mounted in the side walls of the casing 13. An indicator A is pivoted upon said pin 20. The indicator comprises a number of narrow strips 21 which are mounted upon the pin 20. The upper ends of the strips 20 are so cut that they will strike the outer or front side of the casing member 13 for limiting their pivotal movement in one direction. When the casing member 13 is swung to its operative position, as shown in Figure 3, then the strips 21 will each drop by gravity to the position shown in dotted lines and when in this position they will collectively form a comparatively large indicator.

The strips of the indicator A may be painted red so as to attract attention. As soon as the flexible element 16 is released, the casing member will swing on the bolt 14 due to gravity. As the casing member 13 is moved to inoperative position, the strip members 21 will also swing on the pivot 20 so that they rest against each other.

The inner surface of the casing member 10 is provided with a noise-deadener strip 22 which may be either rubber or felt. The strip members 21 will strike against the noise-deadener 22.

In order to hold the casing member 13 within the casing member 10 so that the strips 21 will be held in proper position, I provide a spring 23. The spring 23 is wrapped around the bolt 14 and has one end project over and engage the upper edge of the casing 13. The opposite end of the spring 23 is received within a loop 24 formed from the casing 10. The spring 23 tends to prevent rattling of the parts.

It will be seen that my device may be easily assembled or disassembled. It will also be seen that the device is quite narrow and yet when moved to inoperative position will form an indicating member which is quite large and attractive.

Some changes may be made in the construction and arrangement of the various parts of my invention, without departing from the real spirit and purpose of my invention and it is my intention to cover by my claim, any modified forms of structure or use of mechanical equivalents, which may be reasonably included within its scope.

I claim as my invention:

In a device of the class described, a casing member adapted to be fixed to a vehicle, a swinging casing pivoted at its upper end to the fixed casing, and a number of indicator elements pivotally mounted within the swinging casing and adapted to swing downwardly below the swinging casing when said swinging casing is moved outwardly and upwardly, the pivot of the indicator elements being spaced below the pivot of the swinging casing.

Des Moines, Iowa, January 13th, 1923.

EMIL BERN.